UNITED STATES PATENT OFFICE.

CHARLES N. WAITE, DECEASED, LATE OF WILMINGTON, DELAWARE, BY CORNELIA B. MAGOUN, ADMINISTRATRIX, OF WEST VANCOUVER, CANADA, AND JOSEF E. HEDIN, OF WILMINGTON, DELAWARE, ASSIGNORS OF ONE-THIRD TO WILLIAM H. SHARP, OF PHILADELPHIA, PENNSYLVANIA.

MANUFACTURE OF CELLULOSE.

1,212,158.     Specification of Letters Patent.     Patented Jan. 9, 1917.

No Drawing.     Application filed October 1, 1915. Serial No. 53,637.

*To all whom it may concern:*

Be it known that CHARLES N. WAITE, late a citizen of the United States, residing at Wilmington, in the county of New Castle and State of Delaware, and JOSEF E. HEDIN, a citizen of the United States, residing at Wilmington, in the county of New Castle and State of Delaware, have invented certain new and useful Improvements in the Manufacture of Cellulose, whereof the following is a specification.

The invention relates to improvements in the manufacture of cellulose, and has for its object the prevention of the formation of oxycellulose during the alkaline boil.

When cellulose is subjected to the action of alkali under steam heat, it is easily oxidized, if there is any air present. The pores of the material contain a considerable quantity of air, and this attacks the cellulose. Oxycellulose is readily soluble in alkali, and there is, therefore, in practising the ordinary alkali process, a large waste, during the cooking, due to oxidation and solution. According to this invention this oxidation is prevented by adding to the caustic liquor enough strong reducing agent to absorb the oxygen contained in the pores of the material.

To practise the invention there is produced by any of the known methods, a solution of caustic soda. To this solution is added a small (say less than one-half of one per cent.) but sufficient quantity of a reducing agent, as for example, sulfur or formaldehyde. The sulfur combines with the caustic formation of sodium sulfid, but this reaction occurs without loss of its reducing power. In ordinary practice it is found that the addition of about one-tenth of one per cent. of sulfur calculated upon the total amount of the alkaline liquor to which it is added, produces a satisfactory result. The alkaline liquor containing this small percentage of sodium sulfid produced as above explained, is added to the cellulose containing material in the digester. The digestion is accomplished not by the sodium sulfid, but by the caustic soda, but the sodium sulfid attracts to itself the oxygen which is inevitably present in the pores of the cellulose containing material, and thereby prevents the objectionable formation of oxycellulose which otherwise takes place when such material is digested by a caustic soda solution.

The process is applicable generally to the production of cellulose from any cellulose-containing material. For example, it is applicable to the production of chemical wood pulp from wood, as ordinarily practised in the manufacture of soda pulp for paper making and other similar purposes. In this case the material added to the digester is the wood usually in the form of wood chips, whereupon the process and reaction proceed as has been described, and the resulting product is a particularly pure chemical wood pulp. In this application the amount of sulfur required is found to be exceedingly small. Under some circumstances one hundredth of one per cent. of sulfur (figured on the amount of liquid present in the digester) will accomplish the desired result, the amount depending upon the quantity of air contained in the material or in the digester.

The process is equally applicable to the manufacture of pure cellulose from cotton. This process is usually termed the purification of cotton, and is largely practised when the resulting cellulose is to be employed in the manufacture of explosives, such as nitrocellulose. In the latter case the material added in the digester to the caustic soda solution, to which the small quantity of sulfur has been added as above explained, is cotton in any of the forms in which it is ordinarily available for use in such process. The same reaction takes place, the caustic soda digesting and effecting the removal of impurities and the sodium sulfid preventing the formation of oxycellulose with corresponding waste of the material. It also produces a purer cellulose and one better adapted to the purpose intended.

The process must be sharply distinguished from so-called sulfate processes, as commonly employed in the manufacture of chemical wood pulp, where a much larger quantity of sodium sulfid is employed. In these sulfate processes the sodium sulfid is present in sufficient quantity to be itself the active agent in the digestion of the wood. Such is not the case with this process, where the quantity of sodium sulfid is too small to effect any substantial digestion of the cellulose-containing material, but is sufficient to prevent the oxygen present in the material from producing oxycellulose. Such production of oxycellulose is objectionable not only because it wastes a corresponding amount of cellulose, but because it results in the production of by-products which render the bleaching of the cellulose more difficult.

It is an advantage of the process as compared with the sulfate process, that it is not accompanied by the very objectionable contamination of the atmosphere, which is characteristic of the sulfate process. The very small amount of sulfid needed in the process occasions no perceptible contamination of the atmosphere. At the same time by the process the formation of oxycellulose is as effectively prevented as in the use of the sulfate process. If formaldehyde is used as the reducing agent, there is no contamination of the atmosphere at all.

The cellulose produced by the process has greater strength and flexibility than that produced by the ordinary alkaline process. It bleaches easily and the yield is from five to fifteen per cent. greater from the same quantity of cellulose-containing material.

Having thus described this invention, we claim:

1. The process of producing cellulose which consists in preparing an alkaline solution, adding thereto less than one-half of one per cent. of a reducing agent, and employing the liquor thus produced for the treatment of cellulose-containing material, whereby the reducing agent prevents the free oxygen in such material from forming oxycellulose.

2. The process of producing cellulose which consists in preparing a solution of caustic soda, adding thereto a small quantity of sulfur, with formation of sodium sulfid, and employing the liquor thus produced for the digestion of cellulose-containing material, the quantity of sodium sulfid present being less than one-half of one per cent. and being, therefore, insufficient to act as the digesting agent, but sufficient to prevent the free oxygen in the material from forming oxycellulose during the process of digestion.

3. The process of producing chemical wood pulp, which consists in preparing a solution of caustic soda, adding thereto a small quantity, say about one-tenth of one per cent., of sulfur, with formation of sodium sulfid, and employing the liquor thus produced for the digestion of wood.

In testimony whereof, I have hereunto signed my name at Victoria, B. C., Canada, this 24th day of Sept., 1915.

CORNELIA B. MAGOUN,
*Administratrix of the estate of Charles N. Waite, deceased.*

Witnesses:
E. W. HOLLINGUM,
J. J. CALKINS.

In testimony whereof, I have hereunto signed my name at Philadelphia, Pennsylvania, this seventh day of September, A. D. 1915.

JOSEF E. HEDIN.

Witnesses:
JAMES H. BELL,
E. L. FULLERTON.